March 3, 1959 S. R. ZIMMERLEY ET AL 2,876,065
PROCESS FOR PRODUCING PURE AMMONIUM PERRHENATE
AND OTHER RHENIUM COMPOUNDS
Filed April 11, 1955
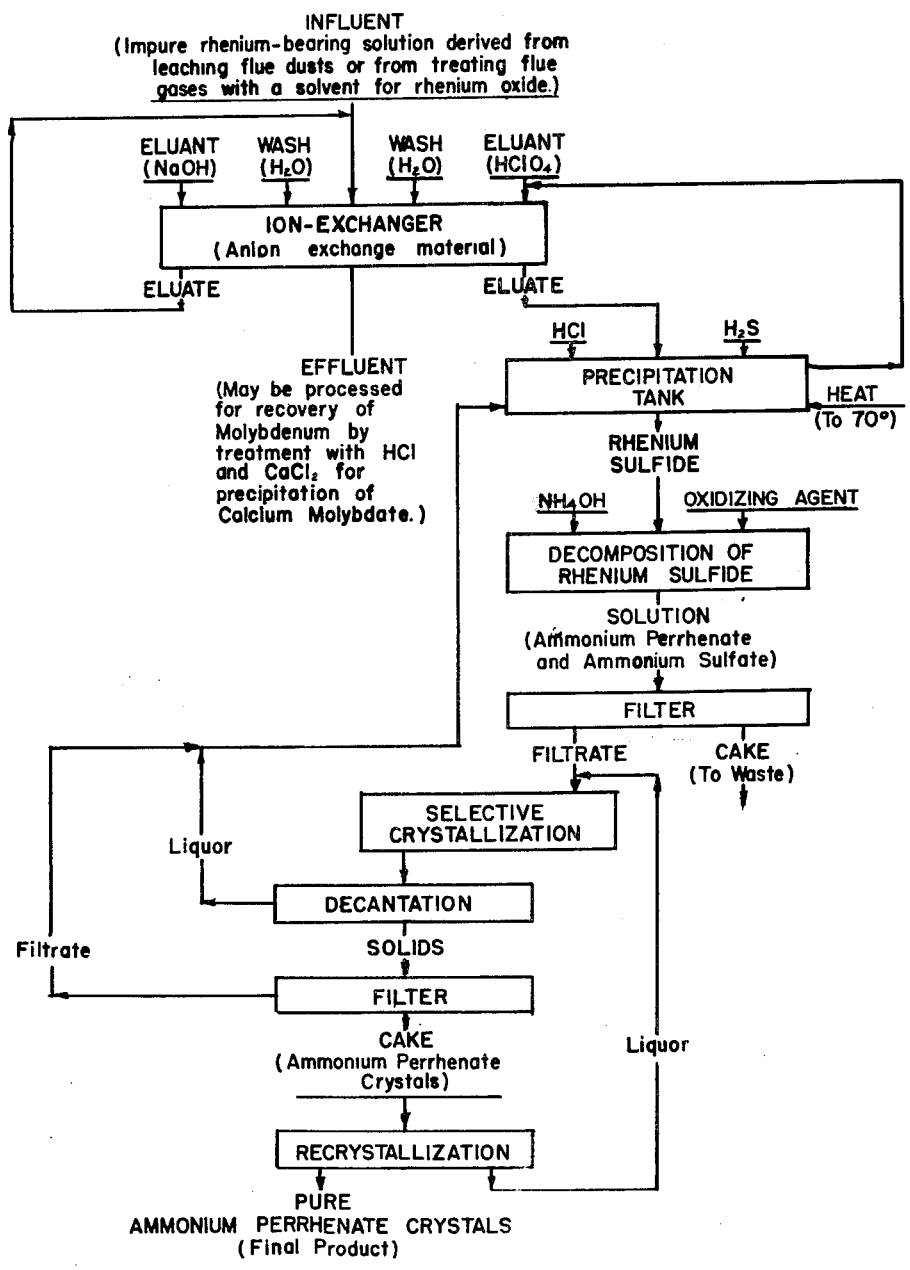
*INVENTORS:*
STUART R. ZIMMERLEY,
JOHN D. PRATER,
BY
ATTORNEYS.

United States Patent Office 2,876,065
Patented Mar. 3, 1959

2,876,065

PROCESS FOR PRODUCING PURE AMMONIUM PERRHENATE AND OTHER RHENIUM COMPOUNDS

Stuart R. Zimmerley and John D. Prater, Salt Lake City, Utah, assignors to Kennecott Copper Corporation, Salt Lake City, Utah, a corporation of New York Application April 11, 1955, Serial No. 500,395

3 Claims. (Cl. 23—51)

This invention relates to the production of rehenium compounds of high purity from impure rhenium-bearing solutions.

Flue dusts and gases derived from the roasting of certain molybdenum sulfide metallurigical concentrates are known to contain rhenium in recoverable amounts. It is also known that the rhenium content of such flue dusts and gases may be extracted on an industrial basis by treatment with water or other solvent for the rhenium. However, the rhenium-bearing solutions so obtained carry a high proportion of molybdenum and other impurities.

Conventional practice for the recovery of rhenium from such solutions involves precipitation of the rhenium as potassium perrhenate by addition of a potassium compound to the solution. The crude potassium perrhenate is subjected to extensive purification, and, if rhenium metal is the desired end product, is converted to ammonium perrhenate by appropriate chemical treatment prior to processing into the metal.

Our process is desired toward not only the recovery of rhenium in the form of an especially pure rhenium salt from these and other impure rhenium-bearing solutions, but also the production of the desired ammonium perrhenate in an exceptionally simple and economical manner and on a commercial basis.

The process involves the combination of an ion-exchange procedure with chemical treatment and selective crystallization of ammonium perrhenate or other rhenium compound.

A preferred practice of the process is outlined by the flow sheet of the accompanying drawing.

As can be seen from the flow sheet, the impure but clarified rhenium-bearing solution is passed through conventional ion-exchange equipment in intimate contact with a suitable anion exchange material, for example, a strongly basic alkyl amine type of synthetic resin such as that known commercially by the designation "Amberlite IRA–400." An optimum rate is ½ gallon per cubic foot of resin per minute. Faster rates are not so advantageous from the standpoint of results.

When the rhenium breakthrough point is reached, that is to say, when rhenium is present in the effluent from the exchange column, the exchange material is rinsed with water to remove any influent solution which may be retained mechanically in the interstices.

The molybdenum and any other minor impurities such as arsenic and selenium which may have been retained by the exchange material, are eluted by passing an alkaline hydroxide eluant, for example, a solution of sodium hydroxide (200 grams of sodium hydroxide per liter of solution), through the column.

Following such elution, the exchange material is again rinsed with water for the purpose of removing any retained hydroxide. Any rhenium removed by the hydroxide is minor, generally less than 1 percent of the total adsorbed rhenium when the rhenium-bearing solution being treated is basic in character.

The adsorbed rhenium is removed from the exchange material by elution with preferably perchloric acid. This acid in concentrations as low as 0.5 molar and in relatively small volume effects complete removal of the rhenium.

Other strong acids highly ionized in aqueous solution are effective for the purpose, for example, hydrochloric, nitric, and sulfuric, but are not as desirable as the perchloric acid because of their larger volume in the stronger concentrations necessary for the purpose.

An optimum rate for both eluants is $\frac{1}{10}$ of a gallon per cubic foot of resin per minute.

While an essentially similar ion-exchange technique has been carried out in the laboratory on an analytical basis and utilizing analytical grades of sodium molybdate and potassium perrhenate in a dilute caustic solution, we have found that the presence of chloride and sulfate ions in the influent solution to the extent unavoidably resulting from leaching flue dusts and scrubbing the gaseous effluent from roaster operations, does not prevent commercially feasible rhenium recovery, see copending application Serial No. 500,390 of Stuart R. Zimmerley and Edward E. Malouf, filed April 11, 1955, and issued as Patent No. 2,809,092 on October 8, 1957.

Rhenium sulfide ($Re_2S_7$) is precipitated from the relatively pure rhenium-bearing perchloric acid solution by the introduction thereinto of a sulfide, preferably by bubbling hydrogen sulfide gas therethrough. Since the perchloric acid solution and the $H_2S$ gas are practically free of impurities, the rhenium sulfide is in a very pure state. It is separated from the solution in any convenient manner, advantageously by filtration.

When other sulfides, such as sodium sulfide, are used in place of $H_2S$ gas, great care should be taken as to their purity. Otherwise impurities will be introduced and co-precipitated with the rhenium.

For effective precipitation, the acidity of the solution should be increased. Accordingly, before introduction of the sulfide, an acid is added to the extent of approximately 7 percent by weight. Hydrochloric acid is preferred for this purpose, but sulfuric and other inorganic acids may be utilized with almost equal effectiveness. Precipitation is facilitated, also, by heating the solution to approximately 70 degrees Centigrade. Under these conditions, the sulfide precipitate coagulates well and can be readily filtered and washed.

The rhenium sulfide so obtained is decomposed by ammonium hydroxide in the presence of an oxidizing agent, such as hydrogen peroxide, oxygen under conditions of elevated temperature and pressure, nitric acid, etc., resulting in ammonium perrhenate and ammonium sulfate in solution.

Since some residual sulfur remains after decomposition of the sulfide, the solution is treated for its elimination prior to recovery of the ammonium perrhenate. As indicated in the flow sheet, filtration is a preferred way of accomplishing this.

The ammonium perrhenate is selectively crystallized from the solution by evaporation, the mother liquor being separated therefrom by decantation and filtration and returned to the rhenium sulfide precipitation stage for recovery of any rhenium which may remain. By repeated tests, we have found that over 90 percent of the rhenium is crystallized out in this manner, leaving less than 10 percent to be recycled.

For obtaining ammonium perrhenate of the highest possible purity, it is preferred to dissolve the ammonium perrhenate crystals in water and to recrystallize by evaporation, thereby removing traces of sulfate which may have been co-precipitated in the first crystallization.

These second crystals of ammonium perrhenate have proven, by spectrographic analysis, to be of extremely high purity. They have, in fact, been of even greater purity than those furnished as spectrographic standards.

While ammonium perrhenate is a desirable end product of the process, other rhenium salts and compounds may be obtained either directly from the intermediate solution of ammonium perrhenate and ammonium sulfate, or from further chemical treatment of the ammonium perrhenate crystals.

Thus, various other perrhenates whose solubilities are lower than ammonium perrhenate may be precipitated from the intermediate solution by the addition of salts of other metals, e. g. potassium, silver, rubidium. Also, other salts of rhenium, such as rhenium dioxide, may be recovered from the intermediate solution by the addition thereto of a reducing agent, and various other compounds may be obtained by the addition of appropriate reagents, an example being crystallization of an amine compound from the solution by the addition thereto of a salt of a metal, such as copper, cobalt, or nickel, prior to evaporation.

Should various other rhenium compounds be desired as end products, or should the ones discussed above be desired in purer form, they may be readily obtained by suitable chemical treatment of the pure ammonium perrhenate. Also( the rhenium sulfide obtained as an intermediate product of the process may be recovered and utilized in and of itself.

While we have found that rhenium heptasulfide ($Re_2S_7$) is obtained relatively free and clear of contaminants when perchloric acid is utilized as the eluant for rhenium, a mixture of the heptasulfide and the disulfide ($ReS_2$), together with free sulfur, is obtained in instances where strong hydrochloric acid (7 N) is used as the eluant.

Whereas this process is here illustrated and described with respect to a particular preferred specific practice thereof, it should be realized that changes may be made within the scope of the following claims, without departing from the essential contributions which we have made to the art.

We claim:

1. A process for the production of exceptionally high purity ammonium perrhenate from a contaminated rhenium-bearing solution, the potassium content of said perrhenate being exceptionally low and insignificant to rhenium metal produced from the perrhenate, said process comprising adsorbing rhenium ions from said contaminated solution by an anionic exchange material; eluting said material with sodium hydroxide for the removal of contaminating anions; thereafter, eluting said material with a weak solution of a strong and highly ionized acid for the removal of the rhenium ions; precipitating the rhenium as a sulfide from the resulting rhenium-bearing eluate solution by introducing into said solution a rhenium-sulfide-forming precipitant of high purity; decomposing the rhenium sulfide in a solution of ammonium hydroxide and an oxidizing agent to provide a solution of ammonium perrhenate and ammonium sulfate; removing residual sulfur from said solution of ammonium perrhenate and ammonium sulfate; removing at least approximately 90% of the rhenium from said solution of ammonium perrhenate and ammonium sulfate, while leaving behind essentially all of the contaminants still present in the solution, by selectively crystallizing ammonium perrhenate from the solution; and separating the ammonium perrhenate crystals from the mother liquor.

2. A process for the production of an exceptionally high purity rhenium compound from a contaminated rhenium-bearing solution, the potassium content of said perrhenate being exceptionally low and insignificant to rhenium metal produced from said perrhenate, said process comprising adsorbing rhenium ions from said contaminated solution by an anionic exchange material; eluting said material with sodium hydroxide for the removal of contaminating anions; thereafter, eluting said material with a weak solution of a strong and highly ionized acid for the removal of the rhenium ions; precipitating the rhenium as a sulfide from the resulting rhenium-bearing eluate solution by introducing into said solution a rhenium-sulfide-forming precipitant of high purity; decomposing the rhenium sulfide in a solution of ammonium hydroxide and an oxidizing agent to provide a solution of ammonium perrhenate and ammonium sulfate; removing residual sulfur from said solution of ammonium perrhenate and ammonium sulfate; removing at least approximately 90% of the rhenium from said solution of ammonium perrhenate and ammonium sulfate, while leaving behind essentially all of the contaminants still present in the solution, by selectively crystallizing a rhenium compound from the solution; and separating the said rhenium compound from the mother liquor.

3. A process for the production of ammonium perrhenate of exceptionally high purity, comprising treating an effluent from the roasting of a rhenium-bearing, molybdenum sulfide, metallurgical concentrate with an aqueous solvent for rhenium oxide, whereby there is obtained a contaminated rhenium-bearing solution containing, among other contaminating ions, sulfate ions, chloride ions, and molybdenum ions; separating most of the contaminating ions from the rhenium ions by contacting said solution with an anionic exchange material, eluting with sodium hydroxide, and then eluting with a weak solution of a strong and highly ionized acid to place the rhenium ions in solution with comparatively few contaminating ions; precipitating the rhenium as a sulfide from the last-named solution by introducing thereinto a rhenium-sulfide-forming precipitant of high purity; decomposing the rhenium sulfide in a solution of ammonium hydroxide and an oxidizing agent to provide a solution of ammonium perrhenate and ammonium sulfate; removing residual sulfur from said solution of ammonium perrhenate and ammonium sulfate; and removing at least approximately 90% of the rhenium from said solution of ammonium perrhenate and ammonium sulfate, while leaving behind essentially all of the said comparatively few contaminating ions along with the ammonium sulfate, by selectively crystallizing ammonium perrhenate from the solution; and separating the ammonium perrhenate crystals from the mother liquor.

References Cited in the file of this patent

Fischer et al.: "Ion Exchange Separation of Rhenium from Molybdenum," Anal. Chem., July 1952, pages 1100–1106.

Ion Exchange, edited by F. C. Nachod (1949), page 220, Academic Press Inc., New York, N. Y.

Rare Metal Handbook, Hampel (1954), page 355, Reinhold Publishing Corporation, New York, N. Y.